United States Patent
Adiba et al.

(10) Patent No.: US 7,240,054 B2
(45) Date of Patent: Jul. 3, 2007

(54) TECHNIQUES TO PRESERVE DATA CONSTRAINTS AND REFERENTIAL INTEGRITY IN ASYNCHRONOUS TRANSACTIONAL REPLICATION OF RELATIONAL TABLES

(75) Inventors: Nicolas G. Adiba, San Jose, CA (US); Roberta J. Cochrane, Los Gatos, CA (US); Elizabeth B. Hamel, Morgan Hill, CA (US); Somil D. Kulkarni, San Jose, CA (US); Bruce G. Lindsay, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 10/788,651

(22) Filed: Feb. 27, 2004

(65) Prior Publication Data
US 2005/0192989 A1    Sep. 1, 2005

(51) Int. Cl.
*G06F 17/30* (2006.01)

(52) U.S. Cl. ......................................... 707/4

(58) Field of Classification Search ................... 707/1, 707/2, 9, 10, 200, 4; 709/224
See application file for complete search history.

(56) References Cited

U.S. PATENT DOCUMENTS 5,758,333 A * 5/1998 Bauer et al. ................... 707/1
6,058,389 A * 5/2000 Chandra et al. ............... 707/1

* cited by examiner

*Primary Examiner*—Etienne P. LeRoux
(74) *Attorney, Agent, or Firm*—Sawyer Law Group LLP

(57) ABSTRACT

An improved method and system for preserving data constraints during parallel apply in asynchronous transaction replication in a database system have been disclosed. The method and system preserves secondary unique constraints and referential integrity constraints, while also allowing a high degree of parallelism in the application of asynchronous replication transactions. The method and system also detects and resolves ordering problems introduced by referential integrity cascade deletes, and allows the parallel initial loading of parent and child tables of a referential integrity constraint.

61 Claims, 8 Drawing Sheets

TECHNIQUES TO PRESERVE DATA CONSTRAINTS AND REFERENTIAL INTEGRITY IN ASYNCHRONOUS TRANSACTIONAL REPLICATION OF RELATIONAL TABLES

FIELD OF THE INVENTION

The present invention relates to asynchronous replication of data in a database system, and more particularly to the handling of data constraints and referential integrity in the asynchronous replication of the data.

BACKGROUND OF THE INVENTION

In a relational database management system, data is stored in a multiplicity of tables having a multiplicity of rows (records), the rows having a multiplicity of columns (fields). A subset of the columns are designated as key columns and the combination of values of the key columns of the rows of a single table must be distinct. It is frequently desired to maintain copies (replicas) of a first table residing in a first database of the relational variety in one or more other databases of the relational variety. Furthermore, it is desired that changes (inserts, deletes, and updates) to rows of the table in the first database be copied (replicated) to the table copies residing in the other databases. Additionally, it is sometimes desired that the changes made to any of the table copies residing in any of the several relational databases be copied (replicated) to all the other table copies.

The propagation of changes made to one copy of the table may be synchronous or asynchronous to the original change. Synchronous propagation makes changes at all copies as part of the same transaction (unit of work) that initiates the original changes. Asynchronous propagation copies the original changes to the other table copies in separate transactions, subsequent to the completion of the transaction initiating the original changes. Synchronous change propagation requires that the database management systems maintaining all (or most) copies be active and available at the time of the change. Also, synchronous change propagation introduces substantial messaging and synchronization costs at the time of the original changes.

The means of detecting changes to be propagated asynchronously can be active or passive. Active change detection isolates the changes, at the time of the change, for later processing using database triggers or a similar mechanism. Passive change detection exploits information from the database recovery log, where changes are recorded for other purposes, to deduce what rows, of which tables, were changed as well as both the old and new values of changed columns.

In a typical database environment, there are varying levels of parallel transactional processing, involving concurrent transactions that execute read and write actions against database information. Fundamental to the nature of a data replication process is the choice of how to move, order and apply that stream of parallel database event changes to a target database.

In ensuring convergence of data in asynchronous replication, the secondary unique data constraints and referential integrity of the data need to be preserved. A secondary unique constraint is a constraint on a column of a table, other than the set of primary key columns that constrains the rows of the table such that this set of columns are unique within each row. A secondary unique constraint can span multiple columns in the same table. Referential integrity (RI) is the state in which all values of all foreign keys at a given database are valid. A referential constraint is the rule that the non-null values of a foreign key are valid only if they also appear as values of a parent key. The table that contains the parent key is called the parent table of the referential integrity constraint, and the table that contains the foreign key is a dependent (child) of that table.

RI constraints can be defined between tables at the source and/or at the target. They provide a mechanism to give more semantic to the data stored. For example, they ensure that the value of a group of columns match the value of a similar group of columns in another table. It is also possible to attach behavior to such constraints. For example when a row is deleted from a table and if it is referenced in other tables, the referencing rows are deleted too. Also unique constraints can be defined on a group of columns such that only one row in the table can have a given set of column values.

One conventional approach of data replication preserves the data constraints, but the transactions are not applied in parallel. Thus, the performance advantage realized from parallel apply of transactions is sacrificed. Another conventional approach uses a proprietary mechanism in the database engine to manage RI constraints during parallel apply of transactions, and is restrictive in what transactions may be applied in parallel. Thus, this approach is inflexible and not extensible.

Accordingly, there exists a need for an improved method and system for preserving data constraints during parallel apply in asynchronous transaction replication in a database system. The improved method and system should preserve secondary unique constraints and referential integrity constraints while also allowing a high degree of parallelism in the application of asynchronous transactions. The improved method and system should also handle ordering problems introduced by referential integrity cascade deletes and allow the parallel initial loading of parent and child tables of a referential integrity constraint. The present invention addresses such a need.

SUMMARY OF THE INVENTION

An improved method and system for preserving data constraints during parallel apply in asynchronous transaction replication in a database system have been disclosed. The method and system preserves secondary unique constraints and referential integrity constraints, while also allowing a high degree of parallelism in the application of asynchronous replication transactions. The method and system also detects and resolves ordering problems introduced by referential integrity cascade deletes, and allows the parallel initial loading of parent and child tables of a referential integrity constraint.

DETAILED DESCRIPTION

The present invention provides an improved method and system for preserving data constraints and referential integrity during parallel apply in asynchronous transaction replication in a database system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 8B in conjunction with the discussion below.

Figure 1:
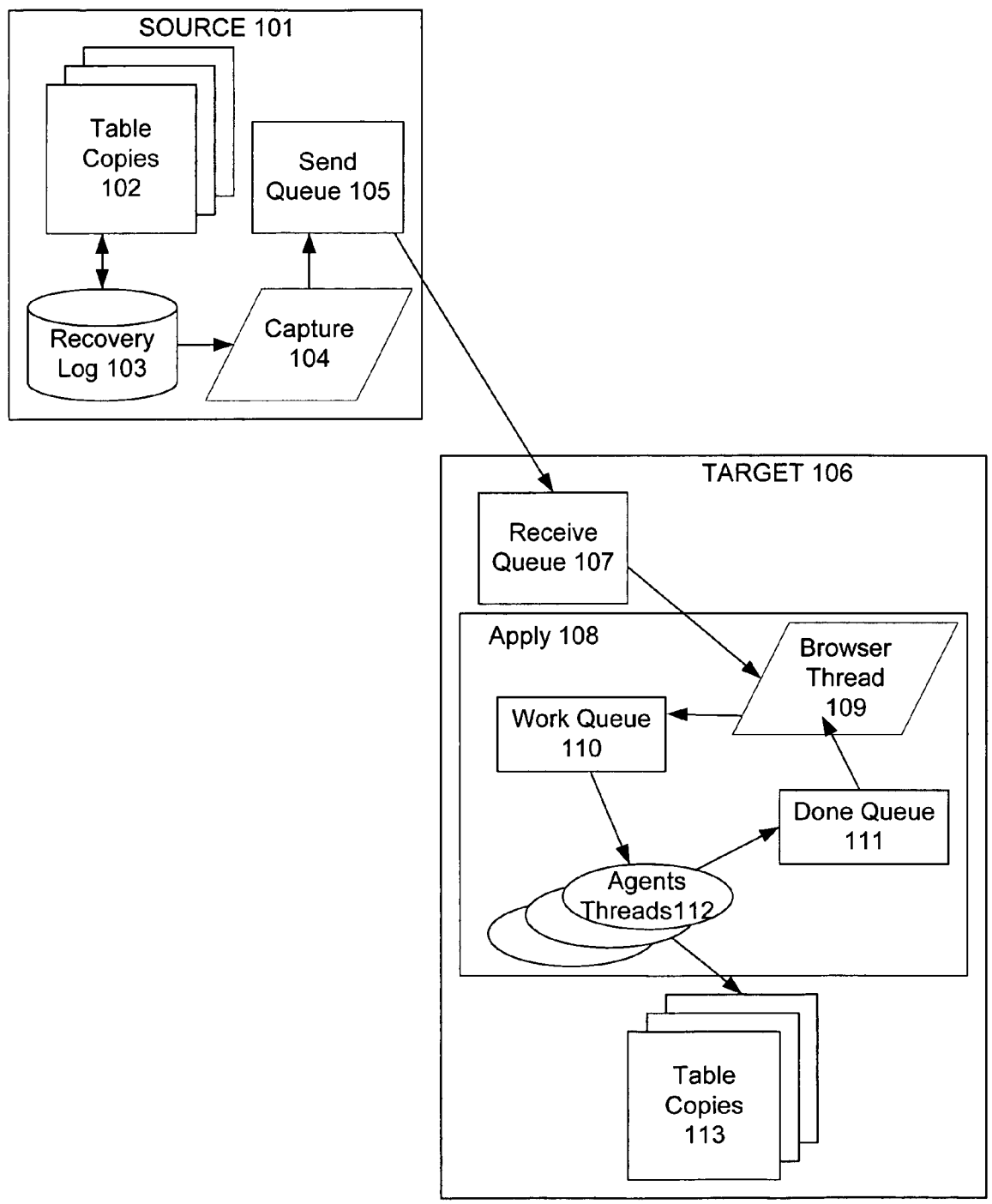
FIG. 1 illustrates an embodiment of a system for preserving data constraints during parallel apply in asynchronous transaction replication in a database system in accordance with the present invention.

FIG. 1 illustrates an embodiment of a system for preserving data constraints during parallel apply in asynchronous transaction replication in a database system in accordance with the present invention. The system includes a source node 101 and a target node 106. At the source node 101 are one or more source table copies 102, a recovery log 103, a Capture program 104 ("Capture"), and a send queue 105. At the target node 106 are a receive queue 107, an Apply program ("Apply") 108 and one or more target table copies 1113. Apply 108 includes a browser thread 109, a work queue 110, a done queue 111, and one or more agent threads 112. Capture 104 reads changes of committed transactions from the recovery log 103 and sends them to Apply 108 running on the target node 106. Apply 108 eventually re-executes the changes of the transactions.

In this embodiment of the present invention, the tabular data at the source table copies 102 whose changes are to be replicated to the target table copies 113 reside in a Relational Database management System (RDBMS) such as the DB2™ RDBMS product offered by International Business Machines Corporation™. The RDBMS maintains a recovery log 103 and a means to query its contents. The entries of the recovery log 103 describe changes to rows of the source tables 102 at source node 101. More specifically, the entries in the recovery log 103 contain information defining (1) the table being changed, (2) the value of the key column in the row being changed, (3) the old and new values of all columns of the changed row, and (4) the transaction (unit of work) containing the change. Recovery log entries for inserted rows contain only new column values while recovery log entries for deleted rows contain only old column values. Recovery log entries for updated rows contain the new and old values of all row columns. The order of entries in the recovery log reflect the order of change operations within each transaction and the order of transaction commit records reflects the order in which transactions are completed.

To control the propagation of changes to table copies, copy control tables (not shown) designating table copies and their target table copies are used by the replication system. The control information includes, but is not limited to: (1) the name of the copied table, (2) a list of the table copies' key columns, (3) filtering and projection information, and (4) the message channels on which to send descriptions of changes to the target table copies.

The type of row operation in change log records can be delete, insert, update, or key update. Updates that do not modify the replication key (update) are distinguished from updates that do modify the replication key (key update). The replication key uniquely identifies a row entity in a target table copy so that it can be located by Apply, in applying an update or delete change operation.

The changes made to table copies are determined by reading the recovery log. Changes are saved in memory until a transaction commit record is seen on the recovery log. Only committed transactions at the source node 101 are moved and applied to target nodes 106. Change records are grouped into their originating source transaction units and written as one logical message unit. Because a logical transaction message can be quite large, it may be broken down into a plurality of physical messages. In this specification, a "transaction" or "transaction message" refers to a logical transaction message. Changes to be sent to the other table copies are sent via logical message units on the recoverable queues (e.g. send queue 105 and receive queue 107) designated in the copy control tables for the table copies of the log records.

The transaction messages are put on the recoverable queue in the source commit order. Within each transaction message, the change records are arranged in the order in which they occurred within the source transaction. In this embodiment, there is no inherent parallelism in the movement of the committed transactional data. The queuing of the transactional data is serialized such that data is moved to the target node 106 in the source transactional commit order.

In capturing the information for individual change records, the type of change operation for each change determines what replication key column values will be sent as part of that change record. For insert and update types of change records, the new replication key column values are sent as part of the change records within the transaction message. By definition, an insert is a new record and therefore has no old values. By definition, the new replication key column values of an update type of change record must be the same as the old replication key column values. For delete type change records, there is by definition no new record, only an old record, and therefore the old replication key column values are sent. For key update records, the old replication key column values are sent in addition to the new replication key column values.

Returning to FIG. 1, for any given receive/recoverable queue 107 that is populated with transaction messages from a given source node 101 and is to be used as the source of changed data to be applied to a given target node 106, Apply 108 has a browser thread 109 and one or more agent threads 112, where the number of agents is determined through user input. The work queue 110 and the done queue 111, structures internal to Apply 108, are created for the purpose of communication between the browser thread 109 and the agent threads 112. The browser thread 109 reads the transaction messages on the receive queue 107 and controls when the transaction message are placed on the work queue 110. Factors considered by the browser thread 109 include the dependencies and data constraints between the current transaction message and transaction messages already examined by the browser thread 109. Transaction messages modifying the same row can be recognized as dependents using techniques described in the co-pending U.S. patent application entitled, "Parallel Apply Processing In Data Replication With Preservation Of Transaction Integrity And Source Ordering Of Dependent Updates", Ser. No. 10/789,775, filed on Feb. 27, 2004. Applicant hereby incorporates this patent application by reference. The agent threads 112 apply the transaction messages on the work queue 110 in parallel with each other.

Figure 2:
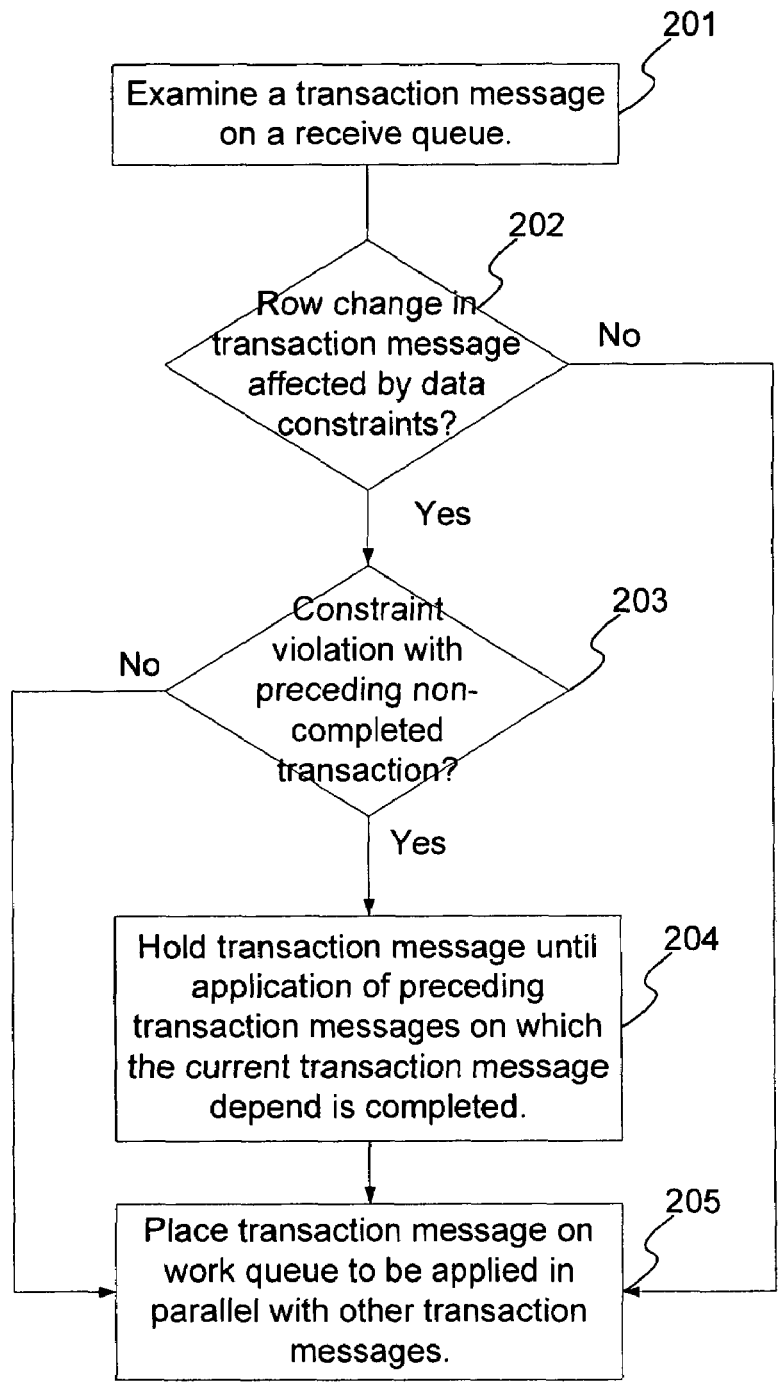
FIG. 2 is a flowchart illustrating an overview of an embodiment of a method for preserving data constraints during parallel apply in asynchronous transaction replication in a database system in accordance with the present invention.

FIG. 2 is a flowchart illustrating an overview of an embodiment of a method for preserving data constraints during parallel apply in asynchronous transaction replication in a database system in accordance with the present invention. First, a transaction message on the receive queue 107 is examined by the browser thread 109, via step 201. The browser thread 109 next determines if the transaction message contains row changes that are affected by data constraints, via step 202. If it does, then the browser thread 109 determines if a row change in the transaction message has a constraint violation with a row change in a preceding non-completed transaction message, via step 203. Transaction constraints, as used in this specification, refers to at least one row change within a transaction message that itself has a data constraint. If not, then the transaction message is placed on the work queue 110 to be applied in parallel with the other transaction message s on the work queue 110, via step 205. If a row change in the transaction message has a constraint violation with a row change in one or more preceding non-completed transaction messages, then the transaction message is held until the application of these preceding transaction messages is completed, via step 204. Once the application of the preceding transaction messages complete, the held transaction message is then placed on the work queue 110 to be applied in parallel with the other transaction messages on the work queue 110, via step 205.

More specifically, the method in accordance with the present invention is able to detect and resolve secondary unique constraints and referential integrity constraints during the parallel application of transaction messages. In addition, it is able to detect and resolve referential integrity constraints for cascade deletes and allow the parallel initial loading of parent and child tables. The method as applied to each of these is described further below.

Parallel Apply of Transaction Messages and Secondary Unique Constraints

Like the replication key, secondary unique constraints constrain the allowable ordering of row updates and inserts in different transaction messages. Unlike the primary key columns which are given special considerations when sending changes from the source to the target (all new and old column values are always transmitted), secondary unique key columns can be other columns whose changed values are transmitted from the source node 101 to the target node 106. Some of the sending modes from source node 101 to target node 106 do not transmit values for unchanged (non-primary key) columns. This is especially the case for deleted rows where only the primary key is transmitted, but the rest of the column values are not sent.

Allowable ordering of updates to a given row, by different transactions, can be detected and enforced by comparing new and old secondary unique column values to avoid incorrect ordering of secondary unique key insert, delete, and update. A critical difficulty is that unchanged, or deleted column values for secondary unique columns may not be transmitted from the source node 101 to the target node 106.

An example of the kind of difficulty that can be introduced by secondary unique constraints is:

T1: insert<PK1, UN1>—insert primary key PK1 with secondary unique key UN1
T2: delete<PK1>—delete primary key PK1
T3: insert<PK2, UN1>—insert primary key PK2 with secondary unique key UN1

If T3 is applied before T2 (there being no common primary key and no value for the secondary unique key columns), T3 will fail with a unique key violation. If T3 is applied before T1, T1 will fail with a unique key violation.

To solve the transaction ordering problems introduced by secondary unique constraints, a combination of techniques is used. Firstly, column value conflicts can be detected and employed to establish ordering dependencies among transactions that update or insert values for unique constraint columns. Secondly, retrying failed insert and update operations is used to allow a logically earlier delete operation to be executed in order to liberate the secondary unique constraint value needed by the insert or update operation.

Figure 3:
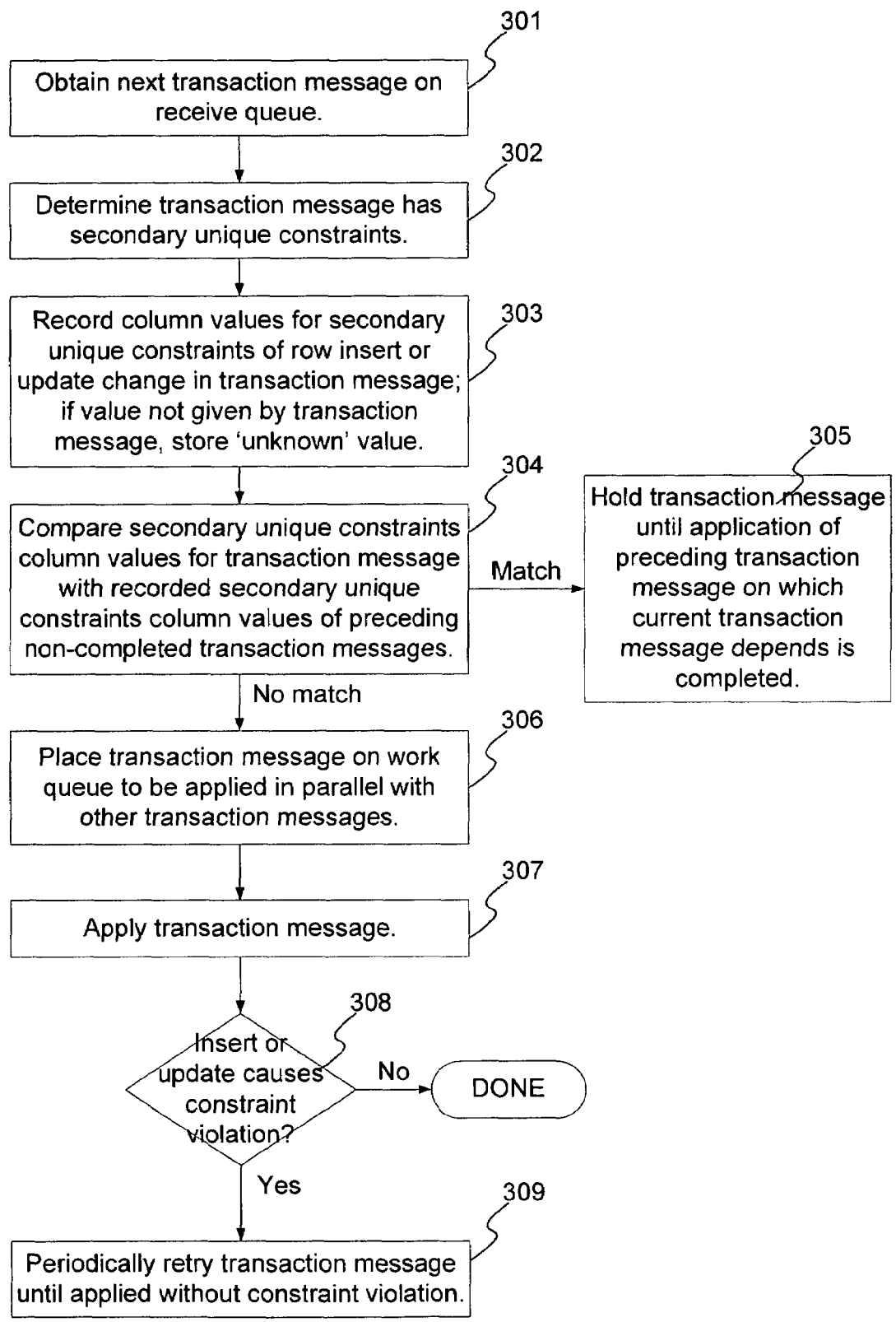
FIG. 3 is a flowchart illustrating an embodiment of the method for preserving secondary unique constraints during parallel apply in asynchronous transaction replication in a database system in accordance with the present invention.

FIG. 3 is a flowchart illustrating an embodiment of the method for preserving secondary unique constraints during parallel apply in asynchronous transaction replication in a database system in accordance with the present invention. First, the browser thread 109 obtains the next transaction message on the receive queue 107, via step 301. The browser thread 109 determines that a row change in the transaction message has secondary unique constraints, via step 302. The column values for the secondary unique constraints of a row insert or update in the transaction message are recorded, via step 303. If a value of a column is not given by the transaction message, because it is not changed, then an 'unknown' value is stored for the column. Next, the browser thread 109 compares the secondary unique constraints column values for the transaction message with the recorded secondary unique constraints column values of preceding non-completed transaction messages, via step 304.

Because a secondary unique constraint may be defined over multiple columns, and because only changed column values may be transmitted from source node 101 to target node 106, the full secondary unique constraint value may not be available at the target node 106. We address missing column values for secondary unique constraints where at least one column of the constraint is changed by defining an out-of-band value for 'unknown' column values of the secondary unique constraint columns. The values of columns of the secondary unique constraint (or representatives thereof, e.g. hash codes of the column values) are recorded for each updated or inserted row having secondary unique constraints. 'Unknown' values are recorded using the out-of-band value. Additionally, for each column for which a value is known, that value is checked against both known values of the corresponding column for earlier transaction messages and against the 'unknown' value of the column for earlier transaction messages. If every known column of the secondary unique constraint matches a known or an 'unknown' value from the same earlier transaction message, then that transaction message may depend on the earlier transaction message that recorded the matching known or 'unknown' column values. A transaction message that may depend on earlier transaction messages is not applied until the application of the depended upon transaction messages is complete. Note that a transaction message needs to depend on only the most recent earlier transaction messages with matching known or 'unknown' values for given columns of secondary unique constraints.

The matching of known and 'unknown' column values for secondary unique constraints can be conservative if matching is based on a deterministic function (e.g. Hashing) of the column values. Additionally, the value used to represent 'unknown' values need not be distinct from all possible known values for the secondary unique constraint column values.

Returning to FIG. 3, if the secondary unique constraints column values for row insert or update changes in a transaction message matches one or more recorded secondary unique constraints column values of preceding non-completed transaction messages, via step 304, then the transaction message is held until the application of the preceding transaction messages on which the current transaction message depends is completed, via step 305.

If no match is found, via step 304, then the transaction message is placed on the work queue 110 to be applied in parallel with the other transaction messages on the work queue 110, via step 306. The transaction message is then applied to the target table, via step 307. If the application of the insert or update causes a constraint violation, via step 308, then the transaction message is periodically retried until it is applied without a constraint violation, via step 309. Since the received transaction message stream is assumed to obey the same secondary unique constraints at the source, a key violation on insert or update, given the computation of transaction message dependencies for known and 'unknown' secondary unique constraint columns values described above, must be due to the fact that a logically preceding delete of a row with the conflicting unique constraint value has not yet been applied. If the retrying transaction message should become the oldest transaction message being applied, then some other manipulation of the target table (or lack of corresponding unique constraints at the source) must be the cause of the unique constraint violations.

Figure 4:
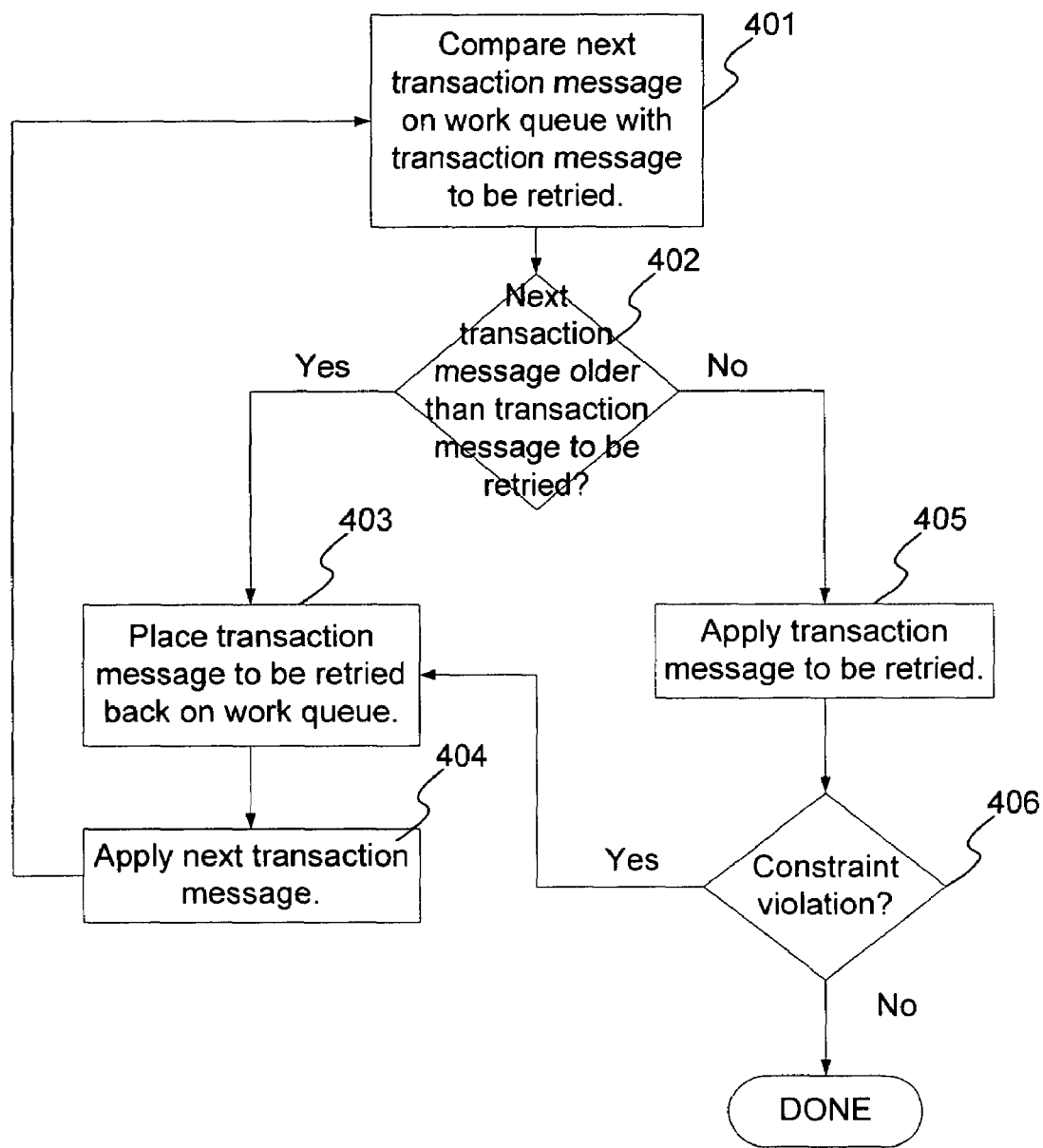
FIG. 4 is a flowchart illustrating in more detail the retry of the transaction in accordance with the present invention.

FIG. 4 is a flowchart illustrating in more detail the retry of the transaction in accordance with the present invention. First, an agent thread 112 compares the next transaction message on the work queue 110 with the transaction to be retried, via step 401. If the next transaction message is older than the transaction message to be retried, via step 402, then the transaction message to be retried is placed back on the work queue 110, via step 403. The next transaction message is then applied by the agent thread 112, via step 404. If the next transaction message is not older than the transaction message to be retried, via step 402, then the transaction message to be retried is applied, via step 406. If its application still results in a constraint violation, via step 406, then it is placed back on the work queue 403 to be retried.

Parallel Apply of Transactions and Referential Integrity Constraints

When applying transaction messages in parallel, coming from a single source, it is necessary to ensure that a more recent transaction message, modifying the same value as an earlier transaction message, doesn't end up being applied in a different order than their commit order at the source. This is to ensure convergence of the data.

Transaction messages modifying the same row can be recognized as dependents. The browser thread 109 reads incoming transaction messages from the receive queue 107 and detects any dependency with any in-flight transaction message. If no dependency is found, the transaction message is inserted into the work queue 110 from which the pool of apply agent threads 112 reads and execute the transaction messages. Once an agent thread 112 has applied a transaction message, it inserts it into the done queue 111. The browser thread 109 checks the done queue 111 for completed transaction messages and updates its dependency graph. Any transaction message without dependencies is eligible to be applied and is inserted into the work queue 110.

These techniques, while ensuring that transaction messages modifying the same rows are not applied out of order by the apply agent threads 112 don't prevent a transaction message modifying the parent key in one table from getting ahead of an insert into a child table of a RI constraint, using this row as its parent table. One way to guarantee the ordering of such transaction messages would be to keep a graph of all the foreign key/parent key relationship and enforce serialization of transaction messages by delaying transaction messages as long as there is an earlier change for a parent or foreign key. A graph for many tables can become extremely complex and is expensive to maintain in terms of the computation required. The method in accordance with the present invention applies a better approach by relying on the following rules:

Detect cross table dependencies that would lead to rows that cannot be applied unless the source order is preserved. Track these dependencies to enforce the order in which the transaction messages are applied.

For all other cross table dependencies, allow the parallel application of transaction messages with cross table dependencies and use a retry mechanism for those transaction messages that run into RI violations.

For this purpose, it is necessary to know the referential integrity constraints between the tables being replicated. Each table has a list of constraints for which it is parent and another list of constraints for which it is child.

Figure 5:
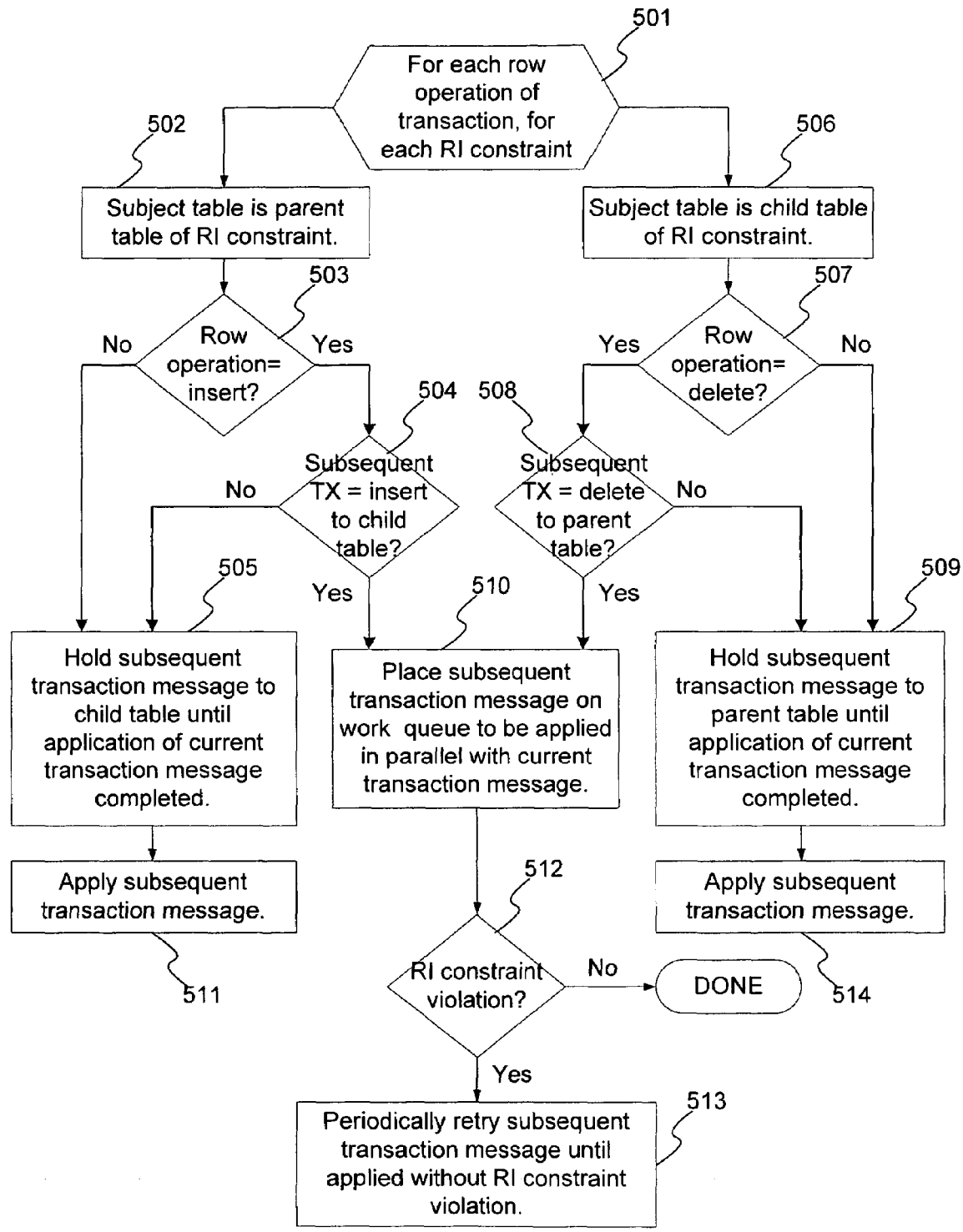
FIG. 5 is a flowchart illustrating an embodiment for preserving referential integrity constraints during parallel apply in asynchronous transaction replication in a database system in accordance with the present invention.

FIG. 5 is a flowchart illustrating an embodiment for preserving referential integrity constraints during parallel apply in asynchronous transaction replication in a database system in accordance with the present invention. The following steps of the method are performed for each row operation of a transaction message and for each referential integrity (RI) constraint (501). When the subject table is a parent table of the RI constraint (502), it is determined if the row operation is an insert, via step 503. If it is, then subsequent transaction messages that are an insert into the child table of the RI constraint, via step 504, are placed on the work queue 110 to be applied in parallel with the current transaction message, via step 510. In other words, an insert into a child table and an insert into a parent table of the same RI constraint are allowed to be applied in parallel, as described further below. If either the row operation is not an insert, via step 503 (i.e., is a delete, update, or key update), or the subsequent transaction is not an insert to the child table, via step 504, then the subsequent transaction message to the child table is held until the application of the current transaction message completes, via step 505. Once completed, the subsequent transaction message to the child table is placed on the work queue 110 and applied, via step 511.

When the subject table is a child table of the RI constraint (506), it is determined if the row operation is a delete, via step 507. If it is, then subsequent transaction messages that are a delete from the parent table of the RI constraint, via step 508, are placed on the work queue 110 to be applied in parallel with the current transaction message, via step 510. In other words, a delete from a child table and a delete from a parent table of the same RI constraint are allowed to be applied in parallel, as described further below. If either the row operation is not a delete, via step 507 (i.e., is an insert, update, or key update), or the subsequent transaction message is not a delete from the parent table, via step 508, then the subsequent transaction message to the parent table is held until the application of the current transaction message completes, via step 509. Once completed, the subsequent transaction message to the parent table is placed on the work queue 110 and applied, via step 514.

At step 510, the subsequent transaction message is applied in parallel with the current transaction message. If the application results in a RI constraint violation, via step 512, then the transaction message is retried periodically, via step 513, until it can be applied without a RI constraint violation. The retrying is performed according to the steps set forth in FIG. 4, described above.

As mentioned in steps 504 and 508, some transaction messages are allowed to execute in parallel. While some parallelism of apply to related tables can cause incorrect results, and therefore must be serialized, the cases of parallel child and parent inserts or parallel child and parent deletes can cause temporary RI failures, but if retried properly, will eventually produce the correct results. By applying a retry logic for these cases according to FIG. 4, a higher degree of parallelism overall is provided, with the tradeoff of the creation of some temporary delays due to RI failures that must be retried.

For example, the insert row operation on the parent table of a RI constraint and the insert row operation on the child table of the same RI constraint, can be executed in parallel. A special logic is used to handle a "no parent row found" type of conflict (i.e. if the insert into the child table is executed before the insert into the parent table is executed). In such case, the insert on the child table can be retried. Eventually the parent insert will be executed two special conditions are taken into account:

Aging of the transaction: How to determine when the transaction message should not be retried anymore?

To solve this special case, a transaction message is retried for a referential integrity violation until it is the oldest non-completed transaction message. At this point if the error persists, the error is due to some other conditions at the target node 106 and not due to the parallel execution of transaction messages. Determining the oldest running transaction message is possible by having the browser thread 109 giving a unique increasing number for each incoming transaction. The browser thread 109 also maintains the transaction number of the oldest transaction message currently in-flight.

Delayed transaction: The transaction message doing the insert on the parent table could have been delayed. If all available agent threads 112 are busy when the insert on the parent table is available to execute then how will the transaction message be applied?

In solve this special case, the work queue 110 acts like a priority queue where the highest priority is at the head of the queue (i.e. where it is read) and the priority number used is the transaction number described previously. Older transactions have higher priority. Therefore whenever a transaction message is cleared from all its dependencies, it is inserted according to its transaction number in the work queue 110. Thus, the older it is, the more towards the head of the work queue 110 it is inserted. Apply agent threads 112, when receiving a retry able error, read and remove the transaction message at the head of the work queue 110. If the transaction message at the head of the work queue 110 is older than the current transaction message, the current transaction message is put back on the work queue 110. If the transaction message at the head of the work queue 110 is not the oldest running transaction message, then the transaction message just retrieved from the work queue 110 can be put back into the work queue 110 (according to its priority).

This algorithm guarantees that a transaction message is not retried forever because all agent threads 112 are busy while the oldest transaction message is still in the work queue 110.

Reordering of Transactions with Cascade Delete

Databases such as IBM DB2 (both UDB and 390) logs cascade deletes parent table(s) first, then child table(s). Tables having referential integrity form a tree with the parent tables at the top. Given such a tree, in the case of a cascade delete, deletes are logged top to bottom. If such sequence of deletes is replayed on the target node 106 and cascade delete RI are defined on the target tables 113, the deletes on parent tables will trigger the deletion of all child rows. So, once the deletes of the child rows captured at the source node 101 are replayed, they will result in row not found conflicts.

The conflicts in themselves don't impact the correctness of the data or the convergence of the source and target tables, because the net effect of a row not found for a delete operation is that the row is gone, as required. However, at a minimum this is a nuisance condition because the error will get logged, and it is not immediately apparent that this is just a nuisance error. In peer-to-peer replication where the cascade deletes under a parent will occur as local updates, they will be needlessly replicated on to other table copies. That is, when the parent delete is a foreign delete being performed by Apply 108, Apply 108 is under control on performing the parent delete and can mark that this came from Apply 108, but the cascade deletes that occur will appear to Capture 104 as local deletes that occurred from a user program, and this defeats the normal recursion control process. The recursion will be finite, as they will stop at the next server, but any unnecessary recursion is a performance impact.

The method in accordance with the present invention solves this problem by reordering these deletes so that there will not be a cascade delete effect at the target node 106, but rather a complete duplication of the events that occurred and were logged at the source. This reordering could be done either by Capture 104 or by Apply 108. Capture 104 can reorder the operations before writing the data out to the queues (only committed transactions are published). Apply 108 can reorder the operations while reading the row operation of a transaction message from a queue, before the transaction message is actually applied.

The exact order of rows spawn from cascade delete depends on the plan generated, they can be logged per branch (each parent row is followed by all its children) or per layer of the tree (all rows for the parents, followed by all rows for eventual siblings then all rows for child tables).

Replaying those deletes in reverse order (starting from child tables to parent tables) won't create missing row conflicts. Also if a table has no child table with a cascade delete constraint, there is no need to reorder it. Such a table is called a "leaf table".

If the table is known to have at least one cascade delete RI constraint, then the following criteria are used to generate a cascade delete sequence:

A row operation marks the end of the current sequence, if: it does not have a parent delete row operation, OR it is not a delete operation, OR it marks the end of the current transaction message.

A row operation marks the beginning of a new sequence, if it is a delete operation and it does not have a parent delete row operation.

A row operation is part of the current sequence, if it is a delete operation and it has a parent delete row operation (i.e. it will be added to the reordered list).

Cascade delete sequences will be reordered when building a representation of the transaction message before it is actually sent on a queue (by Capture 104) or applied (by Apply 108). A given transaction message might contain zero or more such sequences. Each one of them would be reordered. Other operations not in these sequences will not be reordered and if multiple sequences are present in a transaction message they will be applied in the order they are seen, i.e. the source commit order.

The exact order of a cascade delete sequence depends on the query plan that is generated by the database. Given a query plan most often mixes breadth first or depth first deletes, most of the time deletes on a child table don't occur before the deletes on its parent tables (one exception is a child table having two parents).

Capture 104 and Apply 108 have a data structure called the subscription that is a mapping between a source table and a target table (and also the queue to use to transport changes). A subscription has a list of constraints for which it is the parent and another list of constraints for which it is the child. This data structure specifies the information for reordering such as:

Flag whether the table has at least one cascade delete RI;
Flag whether the table is a leaf table;
Each RI description must specify it's type (cascade delete, delete restrict, delete set null, update restrict, update no action).

The reordering algorithm requires a list of rows to be reordered (called the reorder list) and a stack of subscription being reordered (call the subscription stack).

Figure 6:
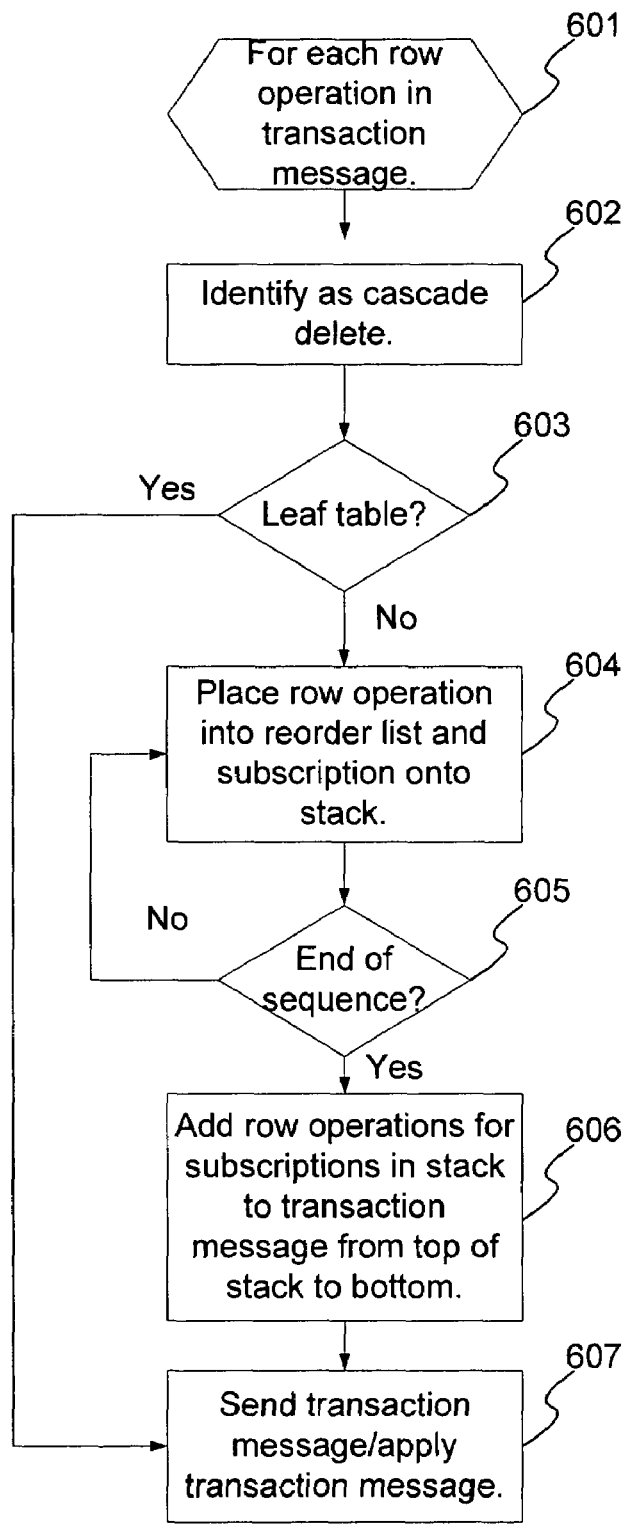
FIG. 6 is a flowchart illustrating an embodiment for preserving referential integrity constraints for cascade deletes during parallel apply in asynchronous transaction replication in a database system in accordance with the present invention.

FIG. 6 is a flowchart illustrating an embodiment for preserving referential integrity constraints for cascade deletes during parallel apply in asynchronous transaction replication in a database system in accordance with the present invention. For each row operation in a transaction message (601), steps 602 through 607 are performed. First, the row operation is identified as part of a cascade delete, via step 602. Next, it is determined if the table involved is a leaf table, via step 603. If so, the transaction message is sent (by Capture) or applied (by Apply), via step 607. Otherwise, the row operation is placed onto the reorder list while the subscription if placed onto the stack, via step 604. The browser thread 109 or capture log reader thread puts on the stack each unique subscription involved in the cascade delete sequence. It puts in the reorder list each row that is not from a leaf table. Once the end of the cascade sequence is identified, via step 605, Capture 104 or Apply 108 goes through the subscriptions on the stack and adds each of the subscription's rows to the transaction message from the top of the stack to the bottom, via step 606, i.e., in reverse order from child to parent. Rows from the reorder list are inserted from last to first for each subscription. This is because of self-referencing tables assuming that in such a case, the parent rows come before child rows. Thus, the child rows are added to the transaction message first. The transaction message is then sent or applied, via step 607. In this manner, the delete of the rows in the child tables are performed before the delete of the rows in the parent table. The cascade deletes thus would not be unnecessarily propagated to other table copies.

Below is the algorithm pseudo-code:

```
reorderList           = [ ] //initially empty
subStack              = [ ] //initially empty
foreach row from message buffer
    if((row.op( ) == DELETE) && row.sub.hasCascadeDelete &&
       (subStack.isEmpty || subStack.hasParentSub (row.sub)))
        if (row.sub.isLeafTable)
            txs.app(row) //can be applied, no need for reordering
        else
                //insert row.sub onto the stack, keep stack
                order by
                //layer of tree
                foreach sub from subStack (starting from top)
                    if (row.sub == sub)
                        break;    //nothing to do, already on
                                  stack, needs
                                  //to show up only once,
                                  this condition
                                  //might be sped up by
                                  tagging subscription
                    elseif (row.sub.isChildOf(sub))
                        row.sub.next = sub.next
                        sub.next = row.sub
                        break;
                    else
                        continue searching
                    endif
                endforeach //loop on the subStack
                reorderList.add(row) //this row needs to be
                reordered
        endif
    else
        //end of the cascade delete reordering sequence
        if (reorderList.isEmpty ( ) )
                //normal case, nothing to do
                txs.add(row)
        else
                //need to insert rows from reorder list back to
                //transaction row list in same order than subStack
                //(top to bottom)
                foreach sub from subStack (top to bottom)
                    foreach reorderedRow from reorderList (last to
first)
                        if (reorderredRow.sub ==sub)
                            txs.add(row)
                            remove (reorderedRow, reorderList)
                        endif
                    endforeach
                    pop sub from subStack
                endforeach
        endif
    endif
endforeach
```

Parallel Load of Data and Referential Integrity Constraints

Apply 108 performs an initial load of the source data into the target table 113. An initial load is necessary so that the target table 113 has the same data as the source table 102. This includes the changes that occurred before replication was started. In allowing for multiple tables to be replicated in parallel, and also allowing for loads of some tables in parallel with ongoing change data replication for other tables, Apply 108 handles any Referential integrity (RI) constraints that may exist between tables that are being loaded in parallel or between a table that is being loaded and a table that is receiving replicated changes in parallel.

An RI constraint enforces the behavior of basic operations like Insert row, Update row and Delete row on two tables. The data in the two tables, thus, becomes related. Furthermore, one table assumes the role of a "Parent" table and the other table becomes its "Child". For example, if a row is inserted into the child table and the parent table does not have the corresponding parent key (violation of rules), then the insert operation will fail. The parallel Apply 108 can allow for multiple parent and child tables to be loaded and replicated at the same time. When data is initially loaded by Apply 108 from the source table into the target table, the data in the target table is replaced. If the target table has RI constraints with other tables on the system, then a replace of the data will violate the rules of the RI constraints. Apply 108 handles these problems by dropping the RI constraints during the initial load and adding them back once the initial load is complete.

Capture 104 and Apply 108 have a data structure, called the subscription, which is a mapping between a source table and a target table. Capture 104 sends a special message, called the Schema message, to the Apply 108 to start initial load and replicate changes. The first step for the Apply 108, on receiving a schema message with initial load, is to identify all the RI constraints that exist on the corresponding target table. The target table may be a parent of other tables and it may be a child of other tables. We must check for both conditions.

Figure 7:
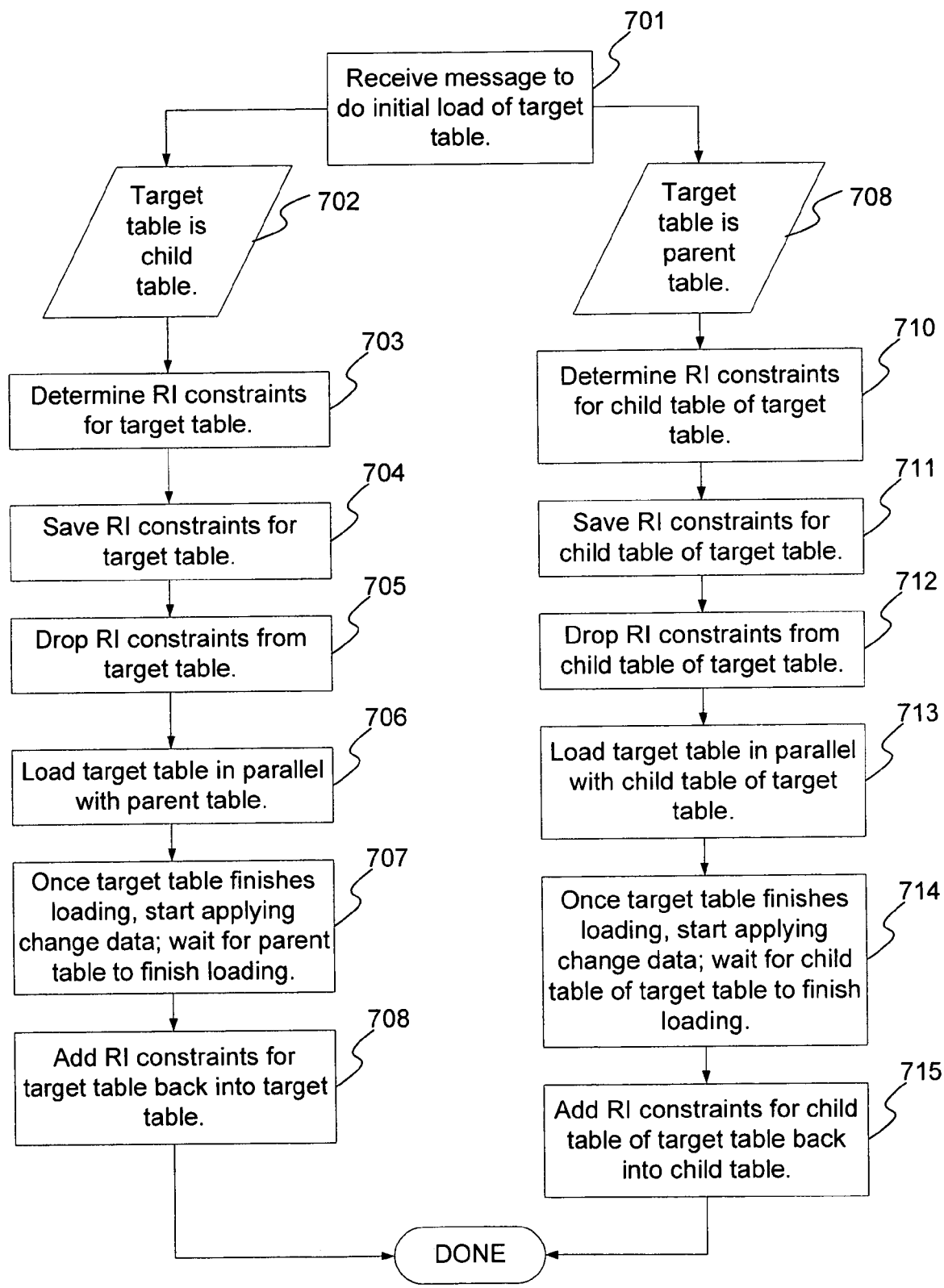
FIG. 7 is a flowchart illustrating an embodiment of the method for preserving referential integrity constraints for parallel initial data loads in asynchronous transaction replication in a database system in accordance with the present invention.

FIG. 7 is a flowchart illustrating an embodiment of the method for preserving referential integrity constraints for parallel initial data loads in asynchronous transaction replication in a database system in accordance with the present invention. Apply 108 receives a message to do an initial load of a target table, via step 701. When the target table is a child table, via step 702, Apply 108 first determines the RI constraints for the child table, via step 703. These RI constraints for the child table are then saved, via step 704. Once saved, the RI constraints are dropped from the child table, via step 705, and the child table is then allowed to load in parallel with the loading or updating of the parent table, via step 706. Once the target table finishes loading, change data can be applied to the target table, via step 707. The process also waits for the parent table to finish loading. Once the parent table finishes loading, the RI constraints for the child table are added back into the child table, via step 708, as described further below.

When the target table is a parent table, via step 709, Apply 108 first determines the RI constraints for the child table of the target table, via step 710. The RI constraints for the child table of the target table are then saved, via step 711. Once saved, the RI constraints are dropped from the child table of the target table, via step 712, and the target table is then allowed to load in parallel with the loading or updating of the child table of the target table, via step 713. Once the target table finishes loading, change data can be applied to the target table, via step 714. The process also waits for the child table to finish loading. Once the child table finishes loading, the RI constraints for the child table of the target table are added back into the child table, via step 715, as described further below.

In this embodiment, when the RI constraints are found for the child table, via step 703, Apply 108 builds one SQL statement to add the constraint to the child table and one SQL statement to drop the constraints from the child table. Similarly, when the RI constraints are found for the parent table, via step 709, Apply 108 builds one SQL statement to add the constraints to the child table of the target table and one SQL statement to drop the constraints from the child table of the target table. The SQL statements to add the constraint are then saved in a special table, SAVERI, a persistent data store, along with other relevant information, like the constraint name. The SQL statements to drop the constraint are then executed.

Because some constraints may have already been saved by the Apply 108, at the receipt of each schema message for each subscription, Apply 108 not only has to read the system catalogs but also has to read the SAVERI table for any RI constraints that it may have dropped earlier. Apply 108 first reads the SAVERI table to read the constraints into memory and then reads the system catalogs to read other RI constraints. Apply 108 then builds an RI dependency structure in memory. This structure is used, among other things, to determine when the RI constraints can be safely added back to the target table.

A load utility is a database utility that connects to the source system, either explicitly (for example, using embedded SQL) or implicitly (for example, using nicknames) and reads all or a subset of the rows in the source table and applies them to the target table. After the RI constraints have been dropped, Apply 108 can initiate a load utility, if requested, or wait for a load utility external to Apply 108 to complete. Apply 108 then applies any row changes that may have been spilled, while the load was going on. More details on loading and spilling is further described in the co-pending U.S. patent application entitled, "Fault Tolerant Mechanism To Handle Initial Load Of Replicated Object In Live System", Ser. No. 10/789,326, filed on Feb. 26, 2004. Applicant hereby incorporates this patent application by reference.

Once the changes have been successfully applied, Apply 108 decides whether to add the RI constraints back to the target table. Apply 108 waits for any dependent subscriptions to finish loading, before adding back the RI constraints. Consider the following scenario:

RI constraint (RIC) has been defined between the parent table (TABP) and child table (TABC). The parent table (defined by subscription SUBP) has completed loading while the child table (defined by subscription SUBC) is still loading. At this point, the RI constraint, RIC, cannot be added to the child table, TABC, because it is loading and hence contains incomplete data. So in this case, Apply 108 needs to wait for the child table, TABC, to finish loading. Once the child table, TABC, finishes loading, the RI constraint, RIC, can be added back to the two tables.

In order to achieve this, Apply 108 maintains an RI dependency structure. It maintains a hash of all the subscription objects and two lists per subscription:

A list of all the parent constraints

A list of all the child constraints

Figure 8A:
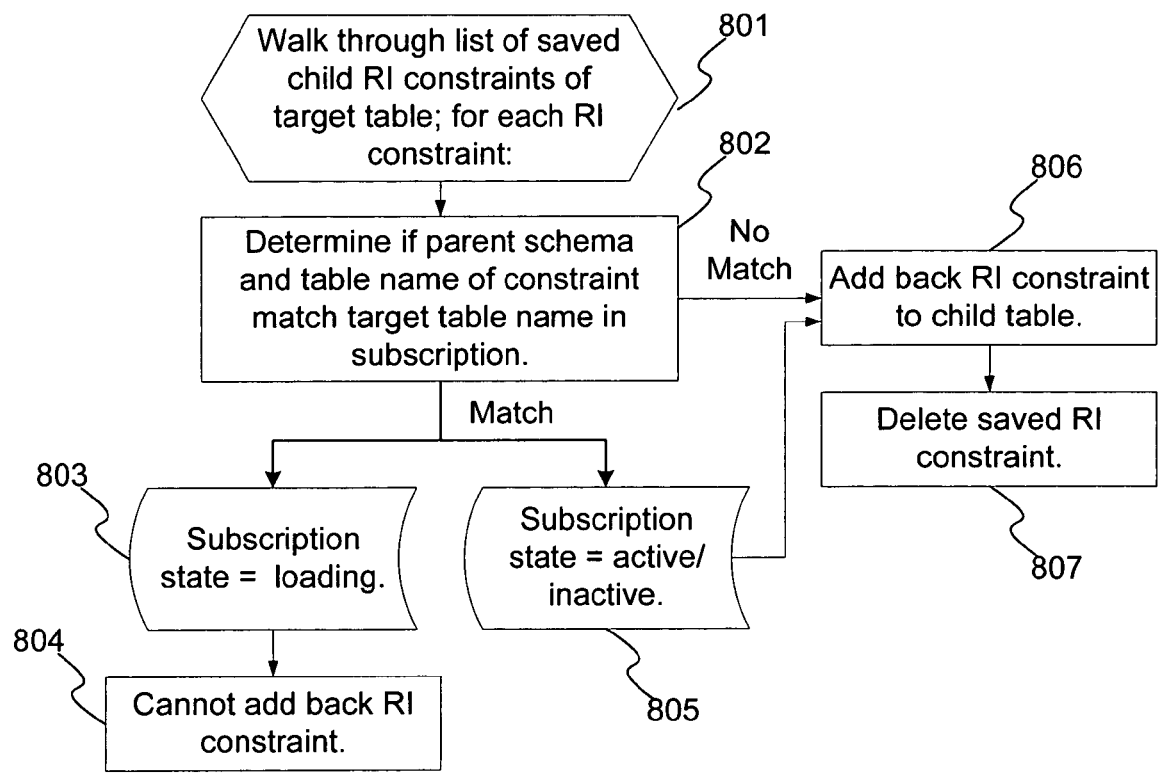
FIGS. 8A and 8B are flowcharts illustrating the detection of dependent subscriptions that are loading for a given subscription in accordance with the present invention.
Figure 8B:
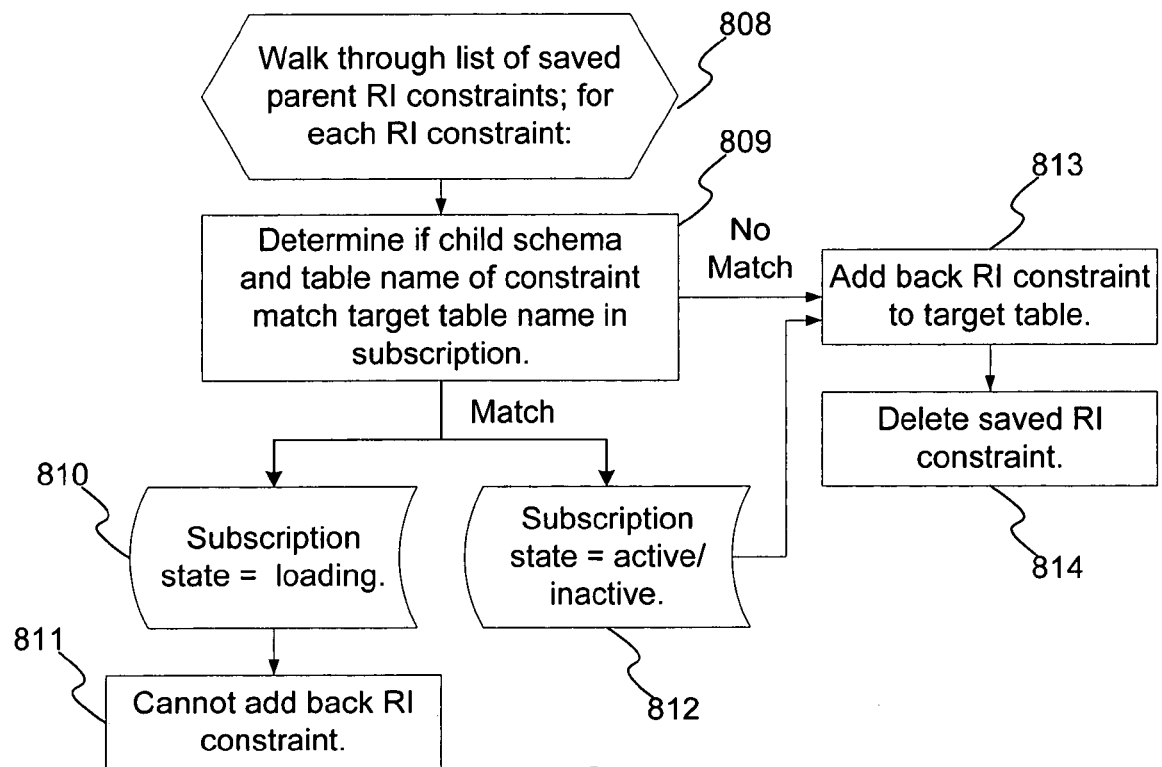

FIGS. 8A and 8B are flowcharts illustrating the detection of dependent subscriptions that are loading for a given subscription in accordance with the present invention. As illustrated in FIG. 8A, Apply 108 walks through the list of saved child RI constraints, via step 801, for the target table. For each child RI constraint, steps 802 through 807 are performed. First, Apply 108 determines if the parent schema and table name of the RI constraint matches the target table name in the subscription, via step 802. If they do not match, then the RI constraint is added back to the child table, via step 806. If they match, then Apply 108 determines if the subscription state is 'active'/'inactive' or 'loading'. If the subscription state is 'loading', via step 803, then the RI constraint cannot be added back, via step 804. In this case, the RI constraint remains saved. If the subscription state is 'active' or 'inactive', via step 805, then the RI constraint is added back to the child table, via step 806. Once added back, the saved RI constraint is deleted, via step 807.

As illustrated in FIG. 8B, Apply 108 also walks through the list of saved parent RI constraints, via step 808. For each RI constraint, steps 809 through 814 are performed. First, Apply 108 determines if the child schema and table name of the RI constraint matches the target table name in the subscription, via step 809. If they do not match, then the RI constraint is added back to the target table, via step 813. If they match, then Apply 108 determines if the subscription state is 'active'/'inactive' or 'loading'. If the subscription state is 'loading', via step 810, then the RI constraint cannot be added back, via step 811. In this case, the RI constraint remains saved. If the subscription state is 'active' or 'inactive', via step 812, then the RI constraint is added back to the target table, via step 813. Once added back, the saved RI constraint is deleted, via step 814.

To put back the RI constraints, Apply 108 looks up the constraint information in it's internal SAVERI table. Apply 108 does the following in the same transaction:
  Read the constraint information from the SAVERI table. Part of this information is the SQL statement to add the RI constraint back. Apply 108 saved this SQL statement when it dropped the constraint;
  Execute the SQL statement to add the RI constraint to the target table; and
  Delete the saved entry in the SAVERI table.

The following example illustrates the process:
Consider the following RI constraint definition between three tables T1, T2 and T3 on the target system. They have two constraints defined. The constraint C1 makes T1 the parent table and T2 the child table. The constraint C2 makes T1 the parent table and T3 the child table.

The tree would look as follows:

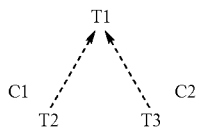

1. Subscription S1 is defined on table T1
2. Subscription S2 is defined on table T2
3. Subscription S3 is defined on table T3

After Apply 108 loads the RI constraints into memory (some from SAVERI table and some from the system catalogs):
  1. Subscription S1's child list is empty (since table T1 is not a child of any other table)
  2. Subscription S1's parent list contains the constraints: C1 and C2
  3. Subscription S2's child list contains the constraint: C1
  4. Subscription S2's parent list is empty (since table T2 is not a parent of any other table)
  5. Subscription S3's child list contains the constraint: C2
  6. Subscription S3's parent list is empty (since table T3 is not a parent of any other table)

At time T=0:
  Initially, S1 is loading (state=L), S2 is loading (state=L), S3 is loading (state=L)

At time T=1:
  The program finishes loading and catch-up for subscription S1 (subscriptions S2 and S3 are still loading)
  Walk through S1's parent list and find a dependent subscription:
    The constraint C1 leads to dependent subscription S2. The state of subscription S2 is loading. The RI constraint C1 is not added back.
    The constraint C2 leads to dependent subscription S3. The state of subscription S3 is loading. The RI constraint C2 is not added back.
  S1's child list is empty.

At time T=2:
  The program finishes loading and catch-up for subscription S2 (subscription S1 is already active and S3 is still loading)
  S2's parent list is empty.
  Walk through S2's child list and find a dependent subscription:
    The constraint C1 leads to dependent subscription S1. The state of subscription S1 is active. The RI constraint C1 is added back.

At time T=3:
  The program finishes loading and catch-up for subscription S3 (subscription S1 and S2 are already active)
  S3's parent list is empty.
  Walk through S3's child list and find a dependent subscription:
    The constraint C2 leads to dependent subscription S1. The state of subscription S1 is active. The RI constraint C2 is added back.

A key aspect of handling the RI constraints during initial load is to deal with error conditions. Two interesting cases are:

Case 1:
  If Apply 108 crashes anytime during the initial load, it uses the information stored in the SAVERI table to recover the RI constraints. If a row exists for an RI constraint in the SAVERI table, Apply 108 loads that constraint into memory. It is also possible that due to some errors, a subscription may be deactivated by Apply 108, and Apply 108 crashes before it is able to add the RI constraints back on the target table. To overcome this situation, Apply 108 records some more information in it's internal tables to help it to recover. On recovery, Apply 108 first tries to add the RI constraints back before processing anything else.

Case 2:
  Apply 108 may get a constraint violation (violation of rules) when trying to put back the RI constraints.
  This can occur if, for example, the parent table is not loaded and the corresponding subscription is inactive, but the child table is loaded and the corresponding subscription is about to be activated. In this case, the child table has more data than the parent and this violates the RI constraint. To handle this, on getting the constraint violation, Apply 108 does not put the RI constraint back. In the future, whenever the subscription corresponding to the parent table is activated, the RI constraint will be put back on.
  Another example is when an insert operation on the parent table and an insert operation on the child table occur in different transaction messages and the insert operation on the parent table is delayed (due to a deadlock, for example). The insert operation on the child table makes it through and Apply 108 is about to activate the subscription corresponding to the child table. In this case, again, the child table will have more data than the parent table, resulting in a constraint violation. Apply 108 then stops reading any more transaction messages and waits for existing in-flight transaction messages to complete. So, in this case, when the insert operation on the parent is finally applied (the deadlock is resolved, for example), the parent and child table will have proportionate data and Apply 108 can successfully put back the RI constraints.

An improved method and system for preserving data constraints during parallel apply in asynchronous transaction replication in a database system have been disclosed. The method and system preserves secondary unique constraints and referential integrity constraints, while also allowing a high degree of parallelism in the application of asynchronous replication transactions. The method and system also detects and resolves ordering problems introduced by referential integrity cascade deletes, and allows the parallel initial loading of parent and child tables of a referential integrity constraint.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for preserving data constraints during parallel application of asynchronous replication transactions in a database system, the method comprising:
   (a) receiving and examining a transaction message comprising one or more row changes;
   (b) determining whether at least one row change in the transaction message is affected by a data constraint;
   (c) responsive to at least one row change in the transaction message being affected by a data constraint, determining whether there is a constraint violation between the at least one row change in the transaction message and a row change in at least one preceding non-completed transaction message;
   (d) responsive to there being a constraint violation between the at least one row change in the transaction message and the row change in the at least one preceding non-completed transaction message, holding the transaction message until application of the at least one preceding non-completed transaction message is completed;
   (e) responsive to application of the at least one preceding non-completed transaction message being completed, placing the transaction message on a work queue; and
   (f) subsequent to placing the transaction message on the work queue, applying the transaction message in parallel with one or more other transaction messages on the work queue.

2. The method of claim 1, wherein the determining (b) comprises:
   (b1) determining that the at least one row change in the transaction message has secondary unique constraint; and
   (b2) recording column values for the secondary unique constraints of the at least one row change in the transaction message, when the at least one row change is a row insert or update.

3. The method of claim 2, wherein if the column value for the secondary unique constraint is not known, then record an "unknown" value.

4. The method of claim 2, wherein the determining (c) comprises:
   (c1) comparing the column values for secondary unique constraints for the at least one row change in the transaction message with recorded column values for secondary unique constraints for the row change in the at least one preceding non-completed transaction message.

5. The method of claim 4, wherein the holding (d) comprises:
   (d1) determining that column values for secondary unique constraints for the at least one row change in the transaction message matches recorded column values for secondary unique constraints for the row change in the at least one preceding non-completed transaction message; and
   (d2) holding the transaction message until the application of the at least one preceding non-completed transaction message completes.

6. The method of claim 5, wherein the holding (d) further comprises:
   (d3) determining that the column values for the secondary unique constraints for the at least one row change in the transaction message do not match the recorded column values for the secondary unique constraints for the row change in the at least one preceding non-completed transaction message; and
   (d4) placing the transaction message on the work queue to be applied in parallel with the other transaction messages on the work queue.

7. The method of claim 6, wherein the placing (d4) comprises:
   (d4i) applying the transaction message to a target table;
   (d4ii) determining if a constraint violation results from the application of the at least one row change in the transaction message; and
   (d4iii) periodically retrying the application of the at least one row change in the transaction message, if the constraint violation results.

8. The method of claim 7, wherein the periodically retrying (d4iii) comprises:
   (d4iiiA) comparing a next transaction message on the work queue with the transaction message to be retried;
   (d4iiiB) determining if the next transaction message is older than the transaction message to be retried;
   (d4iiiC) placing the transaction message to be retried back on the work queue, if the next transaction message is older; and
   (d4iiiD) applying the transaction message to be retried, if the next transaction message is not older.

9. The method of claim 1, wherein the determining (b) comprises:
   (b1) determining that the transaction message has a referential integrity constraint.

10. The method of claim 9, wherein the determining (c) comprises:
    (c1) determining that a target table is a parent table of the referential integrity constraint; and
    (c2) determining if a row operation of the transaction message is a row insert type; and
    (c3) determining if the subsequent transaction message to a child table is the row insert type, if the row operation of the transaction message is the row insert type.

11. The method of claim 10, wherein the holding (d) comprises:
- (d1) holding the subsequent transaction message to the child table until the transaction message completes, if the row operation of the transaction message is not the row insert type;
- (d2) holding the subsequent transaction message to the child table, if the subsequent transaction message to the child table is not the row insert type and the row operation of the transaction message is the row insert type; and
- (d3) placing the subsequent transaction message to the child table on the work queue to be applied in parallel with the transaction message, if the subsequent transaction message to the child table is the row insert type and the row operation of the transaction message is the row insert type.

12. The method of claim 11, wherein the placing (d3) comprises:
- (d3i) applying the subsequent transaction message to the child table;
- (d3ii) determining if a constraint violation results from the application of the subsequent transaction message; and
- (d3iii) periodically retrying the application of the subsequent transaction message, if the constraint violation results.

13. The method of claim 12, wherein the periodically retrying (d3iii) comprises:
- (d3iiiA) comparing a next transaction message on the work queue with the transaction message to be retried;
- (d3iiiB) determining if the next transaction message is older than the transaction message to be retried;
- (d3iiiC) placing the transaction message to be retried back on the work queue, if the next transaction message is older; and
- (d3iiiD) applying the transaction message to be retried, if the next transaction message is not older.

14. The method of claim 9, wherein the determining (c) comprises:
- (c1) determining that a target table is a child table of the referential integrity constraint; and
- (c2) determining if a row operation of the transaction message is a row delete type; and
- (c3) determining if the subsequent transaction message to a parent table is the row delete type, if the row operation of the transaction message is the row delete type.

15. The method of claim 14, wherein the holding (d) comprises:
- (d1) holding the subsequent transaction message to the parent table until the transaction message completes, if the row operation of the transaction message is not the row delete type;
- (d2) holding the subsequent transaction message to the parent table, if the subsequent transaction message to the parent table is not the row delete type and the row operation of the transaction message is the row delete type; and
- (d3) placing the subsequent transaction message to the parent table on the work queue to be applied in parallel with the transaction message, if the subsequent transaction message to the parent table is the row delete type and the row operation of the transaction message is the row delete type.

16. The method of claim 15, wherein the placing (d3) further comprises:
- (d3i) applying the subsequent transaction message to the parent table;
- (d3ii) determining if a constraint violation results from the application of the subsequent transaction message; and
- (d3iii) periodically retrying the application of the subsequent transaction message, if the constraint violation results.

17. The method of claim 16, wherein the periodically retrying (d3iii) comprises:
- (d3iiiA) comparing a next transaction message on the work queue with the transaction message to be retried;
- (d3iiiB) determining if the next transaction message is older than the transaction message to be retried;
- (d3iiiC) placing the transaction message to be retried back on the work queue, if the next transaction message is older; and
- (d3iiiD) applying the transaction message to be retried, if the next transaction message is not older.

18. A method for preserving data constraints during parallel apply in asynchronous transaction replication in a database system, comprising:
- (a) identifying a transaction message as a cascade delete;
- (b) determining that a source of the transaction message is not a leaf table;
- (c) placing each subscription for the transaction message onto a stack and placing row operations for each subscription into a reorder list, wherein the subscriptions are placed onto the stack in order of execution, wherein the row operations are placed into the reorder list in the order of execution; and
- (d) adding the row operations for each subscription in the stack back to the transaction message, wherein the row operations are added in a reverse order of execution, wherein the subscriptions are added in the reverse order of execution.

19. The method of claim 18, further comprising:
- (e) sending the transaction message to be applied to a target table.

20. The method of claim 18, further comprising:
- (e) applying the transaction message at a target table.

21. A method for preserving data constraints during parallel apply in asynchronous transaction replication in a database system, comprising:
- (a) receiving a message to perform an initial load of a target table;
- (b) determining that the target table is a child table of referential integrity constraints;
- (c) saving the referential integrity constraints for the target table;
- (d) dropping the referential integrity constraints from the target table;
- (e) loading the target table in parallel with a loading of a parent table of the referential integrity constraints;
- (f) begin applying change data to the target table once loading is done;
- (g) waiting for the parent table to finish loading, if the parent table has not yet finished loading; and
- (h) adding the referential integrity constraints back into the target table.

22. The method of claim 21, wherein the adding (h) comprises:
- (h1) for each child referential integrity constraint for the target table, determining if a parent schema and table name of the referential constraint matches a target table name in a subscription; and (h2) adding the referential integrity constraints back into a child table of the target table, if the parent schema and table name of the referential constraint do not match the target table name in the subscription.

23. The method of claim 22, wherein the adding (h) further comprises:
(h3) determining a state of the subscription, if the parent schema and table name of the referential constraint matches the target table name in the subscription; and
(h4) adding the referential integrity constraints back into the child table, if the state of the subscription is active or inactive.

24. The method of claim 21, wherein the adding (h) comprises:
(h1) for each parent referential integrity constraint for the target table, determining if a child schema and table name of the referential constraint matches a target table name in a subscription; and
(h2) adding the referential integrity constraint back into the target table, if the child schema and table name of the referential constraint do not match the target table name in the subscription.

25. The method of claim 24, wherein the adding (h) further comprises:
(h3) determining a state of the subscription, if the child schema and table name of the referential constraint matches the target table name in the subscription; and
(h4) adding the referential integrity constraints back into the target table, if the state of the subscription is active or inactive.

26. A method for preserving data constraints during parallel apply in asynchronous transaction replication in a database system, comprising:
(a) receiving a message to perform an initial load of a target table;
(b) determining that the target table is a parent table of referential integrity constraints;
(c) saving the referential integrity constraints for a child table of the target table;
(d) dropping the referential integrity constraints from the child table;
(e) loading the target table in parallel with a loading of the child table;
(f) begin applying change data to the target table once loading is done;
(g) waiting for the child table to finish loading, if the child table has not yet finished loading; and
(h) adding the referential integrity constraints back into the child table.

27. The method of claim 26, wherein the adding (h) comprises:
(h1) for each child referential integrity constraint for the target table, determining if a parent schema and table name of the referential constraint matches a target table name in a subscription; and
(h2) adding the referential integrity constraints back into the child table, if the parent schema and table name of the referential constraint do not match the target table name in the subscription.

28. The method of claim 27, wherein the adding (h) further comprises:
(h3) determining a state of the subscription, if the parent schema and table name of the referential constraint matches the target table name in the subscription; and
(h4) adding the referential integrity constraints back into the child table, if the state of the subscription is active or inactive.

29. The method of claim 26, wherein the adding (h) comprises:
(h1) for each parent referential integrity constraint for the target table, determining if a child schema and table name of the referential constraint matches a target table name in a subscription; and
(h2) adding the referential integrity constraint back into the target table, if the child schema and table name of the referential constraint do not match the target table name in the subscription.

30. The method of claim 29, wherein the adding (h) further comprises:
(h3) determining a state of the subscription, if the child schema and table name of the referential constraint matches the target table name in the subscription; and
(h4) adding the referential integrity constraints back into the target table, if the state of the subscription is active or inactive.

31. A computer readable medium encoded with a computer program for preserving data constraints during parallel application of asynchronous replication transactions in a database system, the computer program comprising instructions for:
(a) receiving and examining a transaction message comprising one or more row changes;
(b) determining whether at least one row change in the transaction message is affected by a data constraint;
(c) responsive to at least one row change in the transaction message being affected by a data constraint, determining whether there is a constraint violation between the at least one row change in the transaction message and a row change in at least one preceding non-completed transaction message;
(d) responsive to there being a constraint violation between the at least one row change in the transaction message and the row change in the at least one preceding non-completed transaction message, holding the transaction message until application of the at least one preceding non-completed transaction message is completed;
(e) responsive to application of the at least one preceding non-completed transaction message being completed, placing the transaction message on the work queue; and
(f) subsequent to placing the transaction message on the work queue, applying the transaction message in parallel with one or more other transaction messages on the work queue.

32. The medium of claim 31, wherein the determining (b) comprises:
(b1) determining that the at least one row change in the transaction message has secondary unique constraint; and
(b2) recording column values for the secondary unique constraints of the at least one row change in the transaction message when the at least one row change is a row insert or update.

33. The medium of claim 32, wherein if the column value for the secondary unique constraint is not known, then record an "unknown" value.

34. The medium of claim 32, wherein the determining (c) comprises:
(c1) comparing the column values for secondary unique constraints for the at least one row change in the transaction message with recorded column values for secondary unique constraints for the row change in the at least one preceding non-completed transaction message.

35. The medium of claim 34, wherein the holding (d) comprises:
- (d1) determining that column values for secondary unique constraints for the at least one row change in the transaction message matches recorded column values for secondary unique constraints for the row change in the at least one preceding non-completed transaction message; and
- (d2) holding the transaction message until the application of the at least one preceding non-completed transaction message completes.

36. The method of claim 35, wherein the holding (d) further comprises:
- (d3) determining that that column values for the secondary unique constraints for the at least one row change in the transaction message do not match the recorded column values for the secondary unique constraints for the row change in the at least one preceding non-completed transaction message; and
- (d4) placing the transaction message on the work queue to be applied in parallel with the other transaction messages on the work queue.

37. The medium of claim 35, wherein the placing (d4) comprises:
- (d4i) applying the transaction message to a target table;
- (d4ii) determining if a constraint violation results from the application of the at least one row change in the transaction message; and
- (d4iii) periodically retrying the application of the at least one row change in the transaction message, if the constraint violation results.

38. The medium of claim 37, wherein the periodically retrying (d4iii) comprises:
- (d4iiiA) comparing a next transaction message on the work queue with the transaction message to be retried;
- (d4iiiB) determining if the next transaction message is older than the transaction to be retried;
- (d4iiiC) placing the transaction message to be retried back on the work queue, if the next transaction message is older; and
- (d4iiiD) applying the transaction message to be retried, if the next transaction message is not older.

39. The medium of claim 31, wherein the determining (b) comprises:
- (b1) determining that the transaction message has a referential integrity constraint.

40. The medium of claim 39, wherein the determining (c) comprises:
- (c1) determining that a target table is a parent table of the referential integrity constraint; and
- (c2) determining if a row operation of the transaction message is a row insert type; and
- (c3) determining if the subsequent transaction message to a child table is the row insert type, if the row operation of the transaction message is the row insert type.

41. The medium of claim 40, wherein the holding (d) comprises:
- (d1) holding the subsequent transaction message to the child table until the transaction message completes, if the row operation of the transaction message is not the row insert type;
- (d2) holding the subsequent transaction message to the child table, if the subsequent transaction message to the child table is not the row insert type and the row operation of the transaction message is the row insert type; and
- (d3) placing the subsequent transaction message to the child table on the work queue to be applied in parallel with the transaction message, if the subsequent transaction message to the child table is the row insert type and the row operation of the transaction message is the row insert type.

42. The medium of claim 41, wherein the placing (d3) comprises:
- (d3i) applying the subsequent transaction message to the child table;
- (d3ii) determining if a constraint violation results from the application of the subsequent transaction message; and
- (d3iii) periodically retrying the application of the subsequent transaction message, if the constraint violation results.

43. The medium of claim 42, wherein the periodically retrying (d3iii) comprises:
- (d3iiiA) comparing a next transaction message on the work queue with the transaction message to be retried;
- (d3iiiB) determining if the next transaction message is older than the transaction message to be retried;
- (d3iiiC) placing the transaction message to be retried back on the work queue, if the next transaction message is older; and
- (d3iiiD) applying the transaction message to be retried, if the next transaction message is not older.

44. The medium of claim 39, wherein the determining (c) comprises:
- (c1) determining that a target table is a child table of the referential integrity constraint; and
- (c2) determining if a row operation of the transaction message is a row delete type; and
- (c3) determining if the subsequent transaction message to a parent table is the row delete type, if the row operation of the transaction message is the row delete type.

45. The medium of claim 44, wherein the holding (d) comprises:
- (d1) holding the subsequent transaction message to the parent table until the transaction message completes, if the row operation of the transaction message is not the row delete type;
- (d2) holding the subsequent transaction message to the parent table, if the subsequent transaction message to the parent table is not the row delete type and the row operation of the transaction message is the row delete type; and
- (d3) placing the subsequent transaction message to the parent table on the work queue to be applied in parallel with the transaction message, if the subsequent transaction message to the parent table is the row delete type and the row operation of the transaction message is the row delete type.

46. The medium of claim 45, wherein the placing (d3) further comprises:
- (d3i) applying the subsequent transaction message to the parent table;
- (d3ii) determining if a constraint violation results from the application of the subsequent transaction message; and
- (d3iii) periodically retrying the application of the subsequent transaction message, if the constraint violation results.

47. The medium of claim 46, wherein the periodically retrying (d3iii) comprises:
- (d3iiiA) comparing a next transaction message on the work queue with the transaction message to be retried;

(d3iiiB) determining if the next transaction message is older than the transaction message to be retried;

(d3iiiC) placing the transaction message to be retried back on the work queue, if the next transaction message is older; and (d3iiiD) applying the transaction message to be retried, if the next transaction message is not older.

48. A computer readable medium with program instructions for preserving data constraints during parallel apply in asynchronous transaction replication in a database system, comprising:

(a) identifying a transaction message as a cascade delete;

(b) determining that a source of the transaction message is not a leaf table;

(c) placing each subscription for the transaction message onto a stack and placing row operations for each subscription into a reorder list, wherein the subscriptions are placed onto the stack in order of execution, wherein the row operations are placed into the reorder list in the order of execution; and (d) adding the row operations for each subscription in the stack back to the transaction message, wherein the row operations are added in a reverse order of execution, wherein the subscriptions are added in the reverse order of execution.

49. The medium of claim 48, further comprising:

(e) sending the transaction message to be applied to a target table.

50. The medium of claim 48, further comprising:

(e) applying the transaction message at a target table.

51. A computer readable medium with program instructions for preserving data constraints during parallel apply in asynchronous transaction replication in a database system, comprising:

(a) receiving a message to perform an initial load of a target table;

(b) determining that the target table is a child table of referential integrity constraints;

(c) saving the referential integrity constraints for the target table;

(d) dropping the referential integrity constraints from the target table;

(e) loading the target table in parallel with a loading of a parent table of the referential integrity constraints;

(f) begin applying change data to the target table once loading is done;

(g) waiting for the parent table to finish loading, if the parent table has not yet finished loading; and (h) adding the referential integrity constraints back into the target table.

52. The medium of claim 51, wherein the adding (h) comprises:

(h1) for each child referential integrity constraint for the target table, determining if a parent schema and table name of the referential constraint matches a target table name in a subscription; and (h2) adding the referential integrity constraints back into a child table of the target table, if the parent schema and table name of the referential constraint do not match the target table name in the subscription.

53. The medium of claim 52, wherein the adding (h) further comprises:

(h3) determining a state of the subscription, if the parent schema and table name of the referential constraint matches the target table name in the subscription; and (h4) adding the referential integrity constraints back into the child table, if the state of the subscription is active or inactive.

54. The medium of claim 51, wherein the adding (h) comprises:

(h1) for each parent referential integrity constraint for the target table, determining if a child schema and table name of the referential constraint matches a target table name in a subscription; and (h2) adding the referential integrity constraint back into the target table, if the child schema and table name of the referential constraint do not match the target table name in the subscription.

55. The medium of claim 54, wherein the adding (h) further comprises:

(h3) determining a state of the subscription, if the child schema and table name of the referential constraint matches the target table name in the subscription; and (h4) adding the referential integrity constraints back into the target table, if the state of the subscription is active or inactive.

56. A computer readable medium with program instructions for preserving data constraints during parallel apply in asynchronous transaction replication in a database system, comprising:

(a) receiving a message to perform an initial load of a target table;

(b) determining that the target table is a parent table of referential integrity constraints;

(c) saving the referential integrity constraints for a child table of the target table;

(d) dropping the referential integrity constraints from the child table;

(e) loading the target table in parallel with a loading of the child table;

(f) begin applying change data to the target table once loading is done;

(g) waiting for the child table to finish loading, if the child table has not yet finished loading; and (h) adding the referential integrity constraints back into the child table.

57. The medium of claim 56, wherein the adding (h) comprises:

(h1) for each child referential integrity constraint for the target table, determining if a parent schema and table name of the referential constraint matches a target table name in a subscription; and (h2) adding the referential integrity constraints back into the child table, if the parent schema and table name of the referential constraint do not match the target table name in the subscription.

58. The medium of claim 57, wherein the adding (h) further comprises:

(h3) determining a state of the subscription, if the parent schema and table name of the referential constraint matches the target table name in the subscription; and (h4) adding the referential integrity constraints back into the child table, if the state of the subscription is active or inactive.

59. The medium of claim 56, wherein the adding (h) comprises:

(h1) for each parent referential integrity constraint for the target table, determining if a child schema and table name of the referential constraint matches a target table name in a subscription; and (h2) adding the referential integrity constraint back into the target table, if the child schema and table name of the referential constraint do not match the target table name in the subscription.

60. The medium of claim 59, wherein the adding (h) further comprises:
(h3) determining a state of the subscription, if the child schema and table name of the referential constraint matches the target table name in the subscription; and
(h4) adding the referential integrity constraints back into the target table, if the state of the subscription is active or inactive.

61. A system comprising:
a work queue;
a receive queue storing a transaction message, the transaction message comprising one or more row changes;
a browser thread in communication with the receive queue and the work queue, wherein the browser thread examines the transaction message on the receive queue, determines whether at least one row change in the transaction message is affected by a data constraint, responsive to at least one row change in the transaction message being affected by a data constraint, determines whether there is a constraint violation between the at least one row change in the transaction message and a row change in at least one preceding non-completed transaction message,
responsive to there being a constraint violation between the at least one row change in the transaction message and the row change in the at least one preceding non-completed transaction message, holds the transaction message until application of the at least one preceding non-completed transaction message is completed, and
responsive to application of the at least one preceding non-completed transaction message being completed, places the transaction message on the work queue; and
one or more agent threads in communication with the work queue, wherein subsequent to placement of the transaction message on the work queue, the one or more agent threads apply the transaction message in parallel with one or more other transaction messages on the work queue.

* * * * *